(12) United States Patent
Blom

(10) Patent No.: US 6,254,279 B1
(45) Date of Patent: Jul. 3, 2001

(54) OPTICAL FIBER CONNECTOR

(75) Inventor: Claes Blom, Skänninge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/218,624

(22) Filed: Dec. 22, 1998

(30) Foreign Application Priority Data

Dec. 23, 1997 (SE) .................................. 9704875

(51) Int. Cl.⁷ .................................. G02B 6/38
(52) U.S. Cl. .................. 385/60; 385/70; 385/72
(58) Field of Search .................. 385/60, 62, 68, 385/69, 70, 72, 78, 86, 87

(56) References Cited

U.S. PATENT DOCUMENTS

| 3,904,269 | | 9/1975 | Lebudska et al. . | |
| 4,812,009 | * | 3/1989 | Carlisle et al. | 385/60 |
| 4,880,291 | | 11/1989 | Aberson, Jr. et al. . | |
| 5,082,345 | * | 1/1992 | Cammons et al. | 385/60 |
| 5,396,572 | * | 3/1995 | Bradley et al. | 385/78 |

* cited by examiner

Primary Examiner—Frank G. Font
Assistant Examiner—Sang H. Nguyen
(74) Attorney, Agent, or Firm—Burns, Doane, Swecker & Mathis, L.L.P.

(57) ABSTRACT

The present invention relates to optical fiber connectors, for bringing optical fibers into contact with each other. In order to simplify manufacture and handling of the optical fiber connectors, for optical fiber cables for example, an optical fiber connector containing precision components has been developed which can be manufactured in large volumes, using inexpensive injection-molded parts of low weight, low physical size and which a can therefore have a low price per connector. Each connector consists of an outer cylindircal portion joined to a tapered portion constituting a breakage protector for a surrounded optical fiber where the cylindrical portion is arranged to be able to surround the optical fiber ferrule with a flange, a spring and a protecting sleeve.

3 Claims, 1 Drawing Sheet

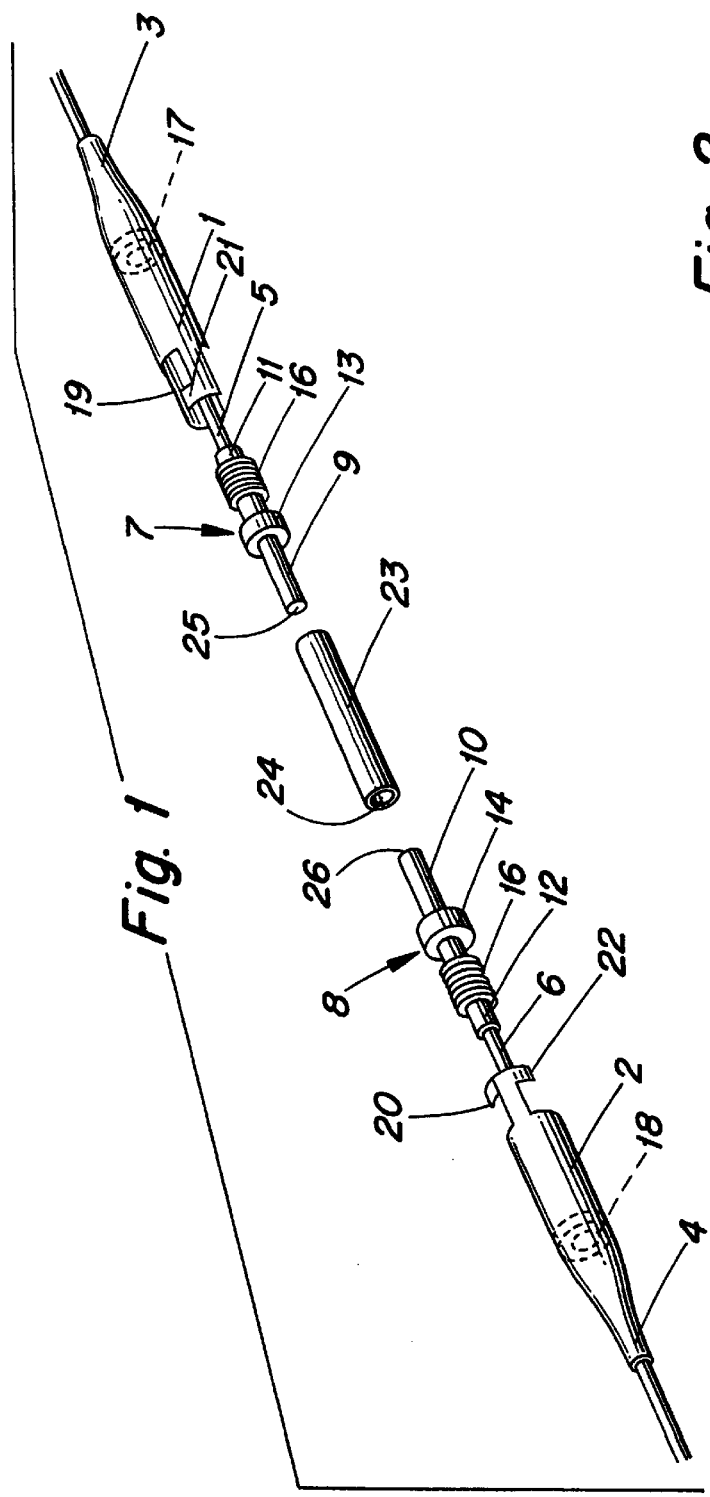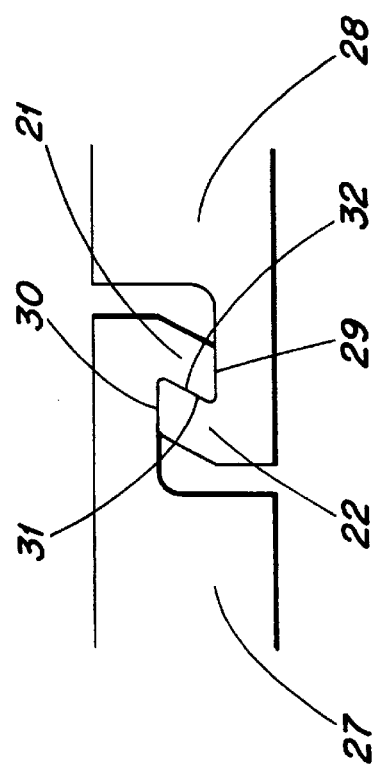

OPTICAL FIBER CONNECTOR

TECHNICAL FIELD

The present invention relates to optical fiber connectors for bringing optofibers into contact with each other.

RELATED ART

Optical fiber connectors, for example, for optofiber cables, have hitherto been manufactured using a technology and materials which gave the finished product a size and weight which was disproportionately large when compared to the optofiber itself in the cable. Breakage of the optofiber can thus easily occur both during handling at the manufactrers of optocomponents and when installing optofiber cables. Furthermore, the optical fiber connectors on the market today are relatively expensive due to the fact that they are constructed of a large number of precision-made parts.

U.S. Pat. Nos. 3,904,269 and 4,880,291 describe previously known optofiber connectors where the optofiber cables joined by means of the connector, are brought in contact with each other at the connector's engagement in each other's opposing grooves or the like.

DESCRIPTION OF THE INVENTION

In order to simplify manufacture and handling of optofiber connectors, e.g. for optofiber cables, an optoconnector comprising precision parts has been developed which car be manufactured in large volumes using inexpensive injection-moulded parts of plastic, for example, thus lowering the price per connector. The optical connector made in this way will have low weight, small physical size and, as mentioned above, also have a low price per connector. Cable running is also facilitated by virtue of the fact that the optical connector can be provided with a smooth spool-shaped surface without any projections which could hook into something surrounding the connector or optical cable. A particular feature of this optical connector is that the parts are identical on either side of the cut where the fiber ends meet so that the number of different parts can be minimized.

The invention will now be described in more detail with the aid of a preferred embodiment and with reference to the accompanying drawings.

DESCRIPTION OF FIGURES

FIG. 1 shows disassembled optical fiber connectors according to the invention.

FIG. 2 shows a detail of the locking means in FIG. 1.

PREFERRED EMBODIMENT

FIG. 1 shows in perspective the various pares somewhat disassembled, where the connectors can be identically made. Each connector consists of an outer cylindrical portion 1, 2 joined to a tapered portion 3, 4 to provide protection against breakage for an enclosed optical fiber 5,6. Each cylindrical portion 1, 2 is arranged to be able to enclose the ferrule 7,8 of an optical fiber. The ferrule consists of a thin cylindrical portion 9,10 in which the optical fibre is glued or otherwise fixed, a cylindrical portion 11,12 in which the optical fiber is glued or clamped with its covering as primary and secondary protection, a flange 13,14, a spring 15,16 arranged to act between the flange and an annular insert 17,18 or the like in the cylindrical portion, and a portion of a surrounding sleeve. The open end of the cylindrical portion has at least one slot 19, 20 and at least one lock shoulder 21, 22 arranged to act together with a corresponding slot and lock shoulder on another outer identical cylinder portion, to connect the connectors. The opposing portions of the ferrules 9,10 directed towards each other are disposed in the contact position to be surrounded by the protecting and centering sleeve 23.

To connect the connectors with their optical fibers, the outer cylindrical portions 1,2 are first moved towards each other, and the cylindrical portions 9,10 on the ferrules 7,8 with their enclosed optical fibers 5, 6 are disposed to be inserted into the cylindrical cavity 24 of the common sleeve 23. The optical fiber end surfaces 25, 26 at the ends of the ferrules are thus disposed to come into contact with each other inside the cavity 24 in the contact position, where the end surfaces of the fibers can be polished or treated in some other manner to obtain low attenuation. In order to assure low attenuation in the contact position, it is required that a certain contact pressure be maintained between the optical fiber ends, and therefore two helical springs 15,16 are arranged behind the flanges 13,14 on the cylindrical portions of the ferrules and act between the flanges and the inner circular stop surfaces 17,18 in the outer cylindrical portions.

The outer cylindrical portions 1, 2 with the cylindrical lock members 19–22 are then advanced towards each other and each helical spring will be compressed between the flange on the ferrule and the inner circular stop surface in the outer cylindrical portion, so that said contact pressure can be maintained and the shoulders 21, 22 on the outer cylindrical portions will move in their slots 19, 20 to a locking end position. In the locking position 27, 28 the outer cylindrical portions are turned towards each other and the shoulders come into their locking positions 29, 30. By making the contact surfaces 31, 32 of the shoulders angled towards each other, an improved locking finction can be achieved by virtue of the fact that the shoulders can be moved towards each other without rotation until they abut against each other (see FIG. 2). The spring tension previously obtained when pressing the outer cylinders against each other will be reduced somewhat as the shoulders are moved to their stop and lock positions.

In order to release the optical connectors and break the optical contact in the interface between the end surfaces of the fibers, the outer cylinders must first be pressed against each other in order for the angled contact surfaces 29, 30 on the shoulders to be able to be released and separated from each other. The outer cylinders can then be rotated from each other, i.e. the shoulders be lifted out of their locked positions and the outer cylinders can then be pulled apart. The tapered ends 3,4 of touter cylinders provide a breakage protection for the optical fibers in the cable ends by virtue of the fact that the diameter of the cylinder becomes gradually smaller and the material thickness is reduced as one moves away from the interface of the optical connector.

FIG. 2 shows in detail how the shoulders are configured in the stop and lock position, and it is clearly evident how the angled shoulders abut agains each other with their contact surfaces.

The invention is of course not limited to the embodiments described above and shown in the drawing. Rather it can be modified within the scope of the accompanying clams.

What is claimed is:

1. An optical fiber connector, comprising:
    a sleeve;
    a first and second outer cylinderical portion, wherein the first and second outer cylinderical portions are located on opposite sides of the sleeve;
    a first and second optical fiber ferrule which are surrounded by the first and second outer cylinderical portions and have optical fibers inserted within, wherein the first and second outer cylinderical portion are located on opposite sides of the sleeve;

spring members which are arranged to press the fiber ends towards each other in a contact position;

the first and second outer cylinderical portions each include a shoulder portion and outer slot, wherein the outer slots communicate with one another to lock the optical fiber connector; and wherein the first and second outer cylinderical portions are identical in configuration to one another, shoulder portions are identical in configuration to one another and outer slots are identical in configuration to one another.

2. The optical fiber connector according to claim 1, wherein the spring member is arranged around the ferrule and acts between a flange on the ferrule and an abutment in the outer sleeve.

3. The optical fiber connector according to claim 1, wherein the shoulder portions are provided with an angled contact surface for improved locking function.

* * * * *